(12) United States Patent
Kameyama et al.

(10) Patent No.: US 8,065,613 B2
(45) Date of Patent: Nov. 22, 2011

(54) IMAGE PICKUP APPARATUS, CONTROL METHOD THEREFOR, IMAGE PICKUP SYSTEM, INFORMATION PROCESSING APPARATUS, PROGRAM AND STORAGE MEDIUM

(75) Inventors: Takaki Kameyama, Yamato-shi (JP); Takashi Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 12/187,039

(22) Filed: Aug. 6, 2008

(65) Prior Publication Data

US 2008/0295034 A1  Nov. 27, 2008

Related U.S. Application Data

(63) Continuation of application No. 11/047,187, filed on Jan. 31, 2005, now Pat. No. 7,418,662.

(30) Foreign Application Priority Data

Feb. 6, 2004 (JP) ................................. 2004-030838
Feb. 6, 2004 (JP) ................................. 2004-031110

(51) Int. Cl.
*G06F 13/00* (2006.01)
*G06F 15/00* (2006.01)

(52) U.S. Cl. ........................................ 715/719; 715/723

(58) Field of Classification Search .......... 715/719–723, 715/734–737, 716, 788, 838, 851
See application file for complete search history.

(56) References Cited

U.S. PATENT DOCUMENTS 6,965,403 B2 * 11/2005 Endo .......................... 348/231.2

FOREIGN PATENT DOCUMENTS

JP 05-236187 A 9/1993
JP 2003-319313 A 11/2003

OTHER PUBLICATIONS

The above reference were cited in on Dec. 2, 2008 Japanese Office Action that issued in Japanese Patent Application 2004-331110.

* cited by examiner

*Primary Examiner* — Cao "Kevin" Nguyen
(74) *Attorney, Agent, or Firm* — Cowan, Liebowitz & Latman, P.C.

(57) ABSTRACT

An image pickup apparatus in which when a decision button is depressed, a transfer confirmation screen is displayed without recording a selection record, and, when a shortcut button is depressed, a selection record is recorded and the transfer confirmation screen is not displayed. When one of image data recorded in a storage medium is selected by an operation of a user, a reproduction module executes reproduction for display of the image data, and upon a user transfer instruction and acceptance of the instruction by a queue, a communication module transfers image data to an external apparatus. When one of other image data recorded in the storage medium is selected by a user operation in the course of a transfer process of the image data by the communication module, the reproduction module executed a reproduction process on the selected other image data.

11 Claims, 10 Drawing Sheets

IMAGE PICKUP APPARATUS, CONTROL METHOD THEREFOR, IMAGE PICKUP SYSTEM, INFORMATION PROCESSING APPARATUS, PROGRAM AND STORAGE MEDIUM

CROSS-REFERENCE TO RELATED APPLICATIONS

This application is a continuation of application Ser. No. 11/047,187, filed Jan. 31, 2005, now U.S. Pat. No. 7,418,662 the entire disclosure of which is hereby incorporated by reference.

BACKGROUND OF THE INVENTION

1. Field of the Invention

The present invention relates to an image pickup apparatus, a control method therefor, an image pickup system, an information processing apparatus, a program and a storage medium, and more particularly to an image pickup apparatus having a function of reproducing image data and transferring pickup it to an information processing apparatus, a control method therefor, an image pickup system, an information processing apparatus, a program and a storage medium.

2. Related Background Art

A conventional image pickup system is provided with a digital camera and a computer which can be mutually connected. In case a user transfers an image, captured with the digital camera, to the computer, the user connects the digital camera and the computer and executes a transfer operation on the computer.

On the other hand, the digital camera is provided with a liquid crystal display and certain buttons, which are operated by the user to call a menu and execute various settings. An example of the operations is as follows:

1. A "MENU" button is depressed to call a setting menu;
2. A four-way switch button is operated to shift a display, indicating a menu item to be selected, to an item to be selected (hereinafter such display operation is called "focusing" and a state where the display indicates an item is called "focused");
3. A "SET" button is depressed to decide a focused item; and
4. A function corresponding to the decided item is executed (for example, cf. Japanese Patent Application Laid-Open No. H11-272389).

The above-mentioned menu has a type of storing a previously selected state and a type of not storing a previously selected state, depending on the type of the digital camera. In the former, when the menu is displayed, a predetermined item, for example, an uppermost item, is always focused. In the latter, when the menu is displayed, a previously selected item is focused. For example, in case a second item from the top was selected previously, such second item from the top is focused when the menu is displayed next time.

The former has an advantage of easy understanding as a focused item is always constant when the menu is displayed. On the other hand, in the latter, in case a particular item is often selected, it is probable that such item is focused from the beginning and there can be obtained an advantage of saving the operation of moving the focus.

Also when an item is selected from the menu, there may be displayed a confirmation as to whether such function is to be actually executed. The user selects "OK" to execute the function, or "cancel" to quit executing the function. Such confirmation is principally executed for a function involving a danger of losing data such as an erasure of all the images.

The above-mentioned two methods have respective advantages as explained above, and it is not possible to uniquely determine which method is superior, depending on the user and the situation of use, so that either of the two method has to be selected to perform the menu operation.

Also the confirmation of the execution required when an item is selected from the menu involves a drawback of increasing the number of operations, while it provides an advantage of increasing safety.

Also there has been disclosed a system in which an operation member (button) provided in the aforementioned digital camera is operated by the user to select an image to be transferred and to transfer the selected image to the connected computer. In case of transferring image data for example to an externally connected computer or the like by a user operation of the operation member provided on the digital camera, the user selects an image to be transferred by looking at an image displayed on a display apparatus of the digital camera. Also in order to facilitate the user to find a desired setting item, there has been disclosed an image pickup apparatus in which a currently selected set item is made identifiable and a number of settable items is rendered variable according to the current state of the image pickup apparatus (for example, Japanese Patent Application Laid-Open No. 2001-326836).

However, in the aforementioned case of selecting an image to be transferred to the computer under observation of the image displayed on the display apparatus of the digital camera, the transfer may require a certain time if the transferred image data have a large data size, and a next image is not displayed on the display apparatus until such transfer is completed. Therefore, in case the image data transfer results in a long waiting time, the user requesting a rapid response is given a stress.

SUMMARY OF THE INVENTION

The present invention has been made in consideration of the aforementioned situation, and is to provide an image pickup apparatus, a control method therefor, an image pickup system, and an information processing system, enabling a comfortable selecting operation for the image data to be subjected to a transfer process, and a storage medium and a program for use therein.

Another object of the present invention is to provide an image pickup apparatus, a control method therefor, an image pickup system, and an information processing system, in which a user can select whether a menu selecting position is stored and whether a confirmation for execution is made, and a storage medium and a program for use therein.

According to an aspect of the invention, the aforementioned objects can be attained by an image pickup apparatus which includes a display device for displaying a menu, a menu decision button for deciding a menu displayed on the display device, menu storage means which stores the decided menu, execution confirmation means which confirms whether the decided menu is to be executed, a shortcut button for omitting the confirmation by the execution confirmation means, and control means which causes, when the menu decision button is depressed, the execution confirmation means to execute the confirmation without the decided menu being stored by the menu storage means, and also causes, when the shortcut button is depressed, the menu storage means to store the decided menu and the execution confirmation means not to execute the confirmation.

According to another aspect of the invention, an image reproducing apparatus includes communication means capable of a communication with an external apparatus, recording means which records image data, selection means which selects one of image data recorded in the recording means, display means which displays an image and character information, reproduction means which executes a reproduction process for displaying image data, selected by the selection means, on display means, accepting means which accepts, in response to a user operation, a transfer instruction to transfer image data currently subjected to a reproduction process by the reproduction means, to an external apparatus, and transfer means which transfers the image data, for which the transfer instruction is accepted by the accepting means, to the external apparatus through the communication means, wherein the selection means is arranged to select one of other image data recorded by the recording means during the transfer process of the image data by the transfer means.

Other objects, features and advantages of the invention will become apparent from the following detailed description taken in conjunction with the accompanying drawings.

DESCRIPTION OF THE PREFERRED EMBODIMENTS

In the following, embodiments of the present invention will be explained in detail with reference to the accompanying drawings.

Figure 1:
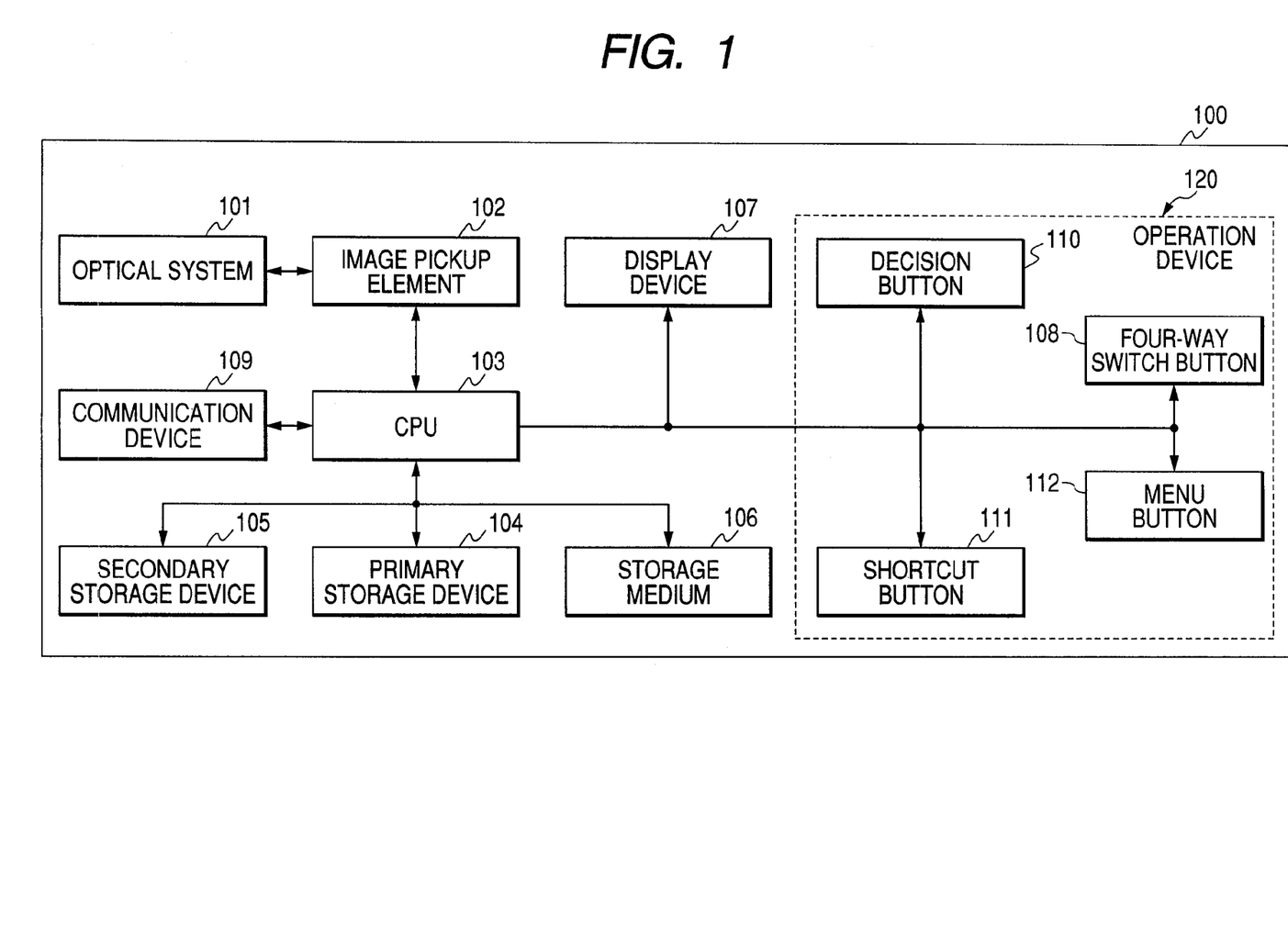
FIG. 1 is a block diagram schematically showing a configuration of an image pickup apparatus embodying the present invention.

FIG. 1 is a block diagram schematically showing a configuration of an image pickup apparatus embodying the present invention.

Referring to FIG. 1, an image pickup apparatus 100, such as a digital camera, is provided with a CPU 103, and, an image pickup element 102, a primary storage apparatus 104, a secondary storage apparatus (memory storage means) 105, a storage medium 106, a display device 107, a four-way switch button 108, a communication apparatus 109, a decision button (menu decision button) 110, a shortcut button 111 and a menu button 1102, each connected to the CPU 103. The image pickup apparatus 100 is also provided with an optical system 101 connected to the image pickup element 102. The four-way switch button 108, the decision button 110, the shortcut button 111 and the menu button 112 constitute together an operation device 120.

The optical system 101 is constituted of a lens, a shutter and a diaphragm, and focuses a light from an object at an appropriate amount and an appropriate timing on an image pickup plane of the image pickup element 102. The image pickup element 102 converts the light, focused on the image pickup place by the optical system 101, into image data. The CPU 103 executes various calculations and controls various components constituting the digital camera 100. The primary storage apparatus 104 temporarily stores data and is used as a work area for the CPU 103. The secondary storage apparatus 105 stores a program (such as a firmware) for controlling the digital camera 100 and various setting information.

A storage medium 106 stored picked-up image data and the like. After image pickup, the storage medium 106 may be detached and mounted, for example, on a personal computer for data readout. The display device 107 executes a display of a view finder image generated during an image pickup operation, a display of a stored image, a character display for dialog operations, and a menu display. The four-way switch button 108 accepts an input of directions of up, down, right and left. The communication apparatus 109 is connected with an information processing apparatus 200 shown in FIG. 3 and to be explained later as an external apparatus, to exchange control commands and data. The communication apparatus 109 may be wired or wireless or may be connected with the information processing apparatus 200 either directly or through a network.

Specifically, the storage medium 106 stores for example image data captured by the image pickup element 102. The storage medium 106 is rendered detachably mountable on the digital camera 100, and may be detached after image pickup and mounted, for example, on the personal computer for reading the data. The display device 107 executes a display of a view finder image generated during an image pickup operation, a reproduction display of a pickup image, and a character display for dialog operations (GUI). The four-way switch button 108 accepts an input of directions of up, down, right and left. The communication apparatus 109 communicates with an external apparatus (an information processing apparatus 200 in this case) for exchanging control commands and image data. The communication apparatus 109 may utilize a communication form of wired communication or wireless communication, and may adopt a form of directly connected with the external apparatus or connected through a network.

The decision button 110 and the shortcut button 111 are both used for deciding a focused item on the menu, but are different in that a decided item is not memorized for the former while a decided item is memorized for the latter. Also the shortcut button 111 has a light-emitting function and shows accepting states of the button by turn-on/turn-off/blinking. The light emitting function may be achieved by a light emission of the button itself or by a light-emitting apparatus provided separately from the button.

When a menu item is decided by a depression of the decision button 110, such item is not memorized, and, when the menu is called next time, an item same as in the previous time is displayed in a focused state. When a menu item is decided by a depression of the shortcut button 111, such items is memorized, and, when the menu is called next time, the previously selected item is displayed in a focused state.

The menu button 112 has a function of calling a menu 301.

Figure 2:
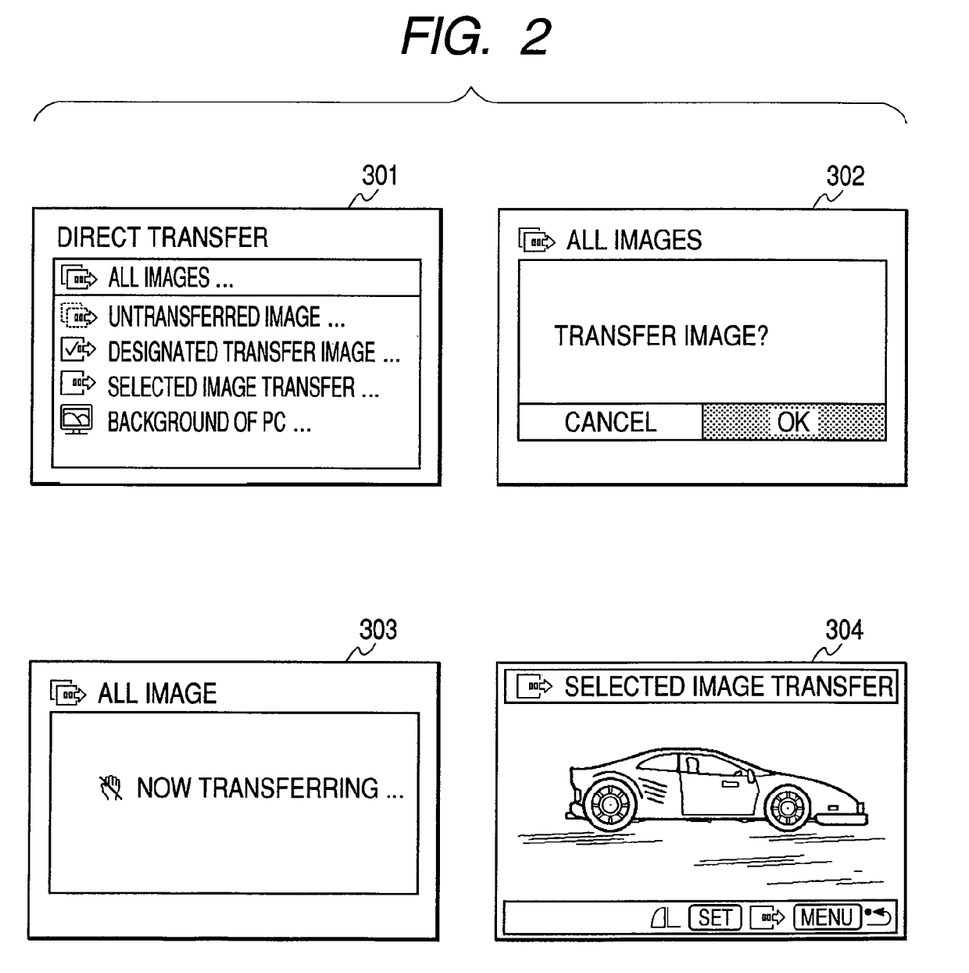
FIG. 2 is a view showing examples of display in a display device shown in FIG. 1.

FIG. 2 is a view showing examples of display in the display device 107 in FIG. 1.

In FIG. 2, a menu display screen 301 shows a menu in which a function to be executed is selected. An underlined item is a focused item. The user moves the focus by operating the four-way switch button 108, thereby designating an item to be selected.

In FIG. 2, a transfer confirmation screen 302 requests, to the user, a confirmation as to whether a transfer is executed or not. This is displayed before execution of a conventional function of collectively transferring plural image data, such as "all images," "untransferred image" or "designated transfer image."

In FIG. 2, a now-transferring display screen 303 indicates that a transfer process of the image data is in progress. This is displayed during execution of the conventional function of collectively transferring plural image data, such as "all images," "untransferred image" or "designated transfer image."

In FIG. 2, an image selection screen 304 is used for designating a transfer under observation of images one by one. It is displayed when "selected image transfer" or "background of personal computer" is selected.

While this image selection screen 304 is displayed, the user can select and display an image recorded in the digital camera 100 by operating the four-way switch button 108 provided in the digital camera 100.

The shortcut button 111, by its light-emitting function, indicates to the user that an operation is in progress by blinking when "all images," "untransferred image" or "designated transfer image" is selected and executed. Also, when "selected image transfer" or "background of personal computer" is selected, the shortcut button 111, by its light-emitting function, indicates to the user that an operation is in progress by blinking while the image data are transferred.

Figure 3:
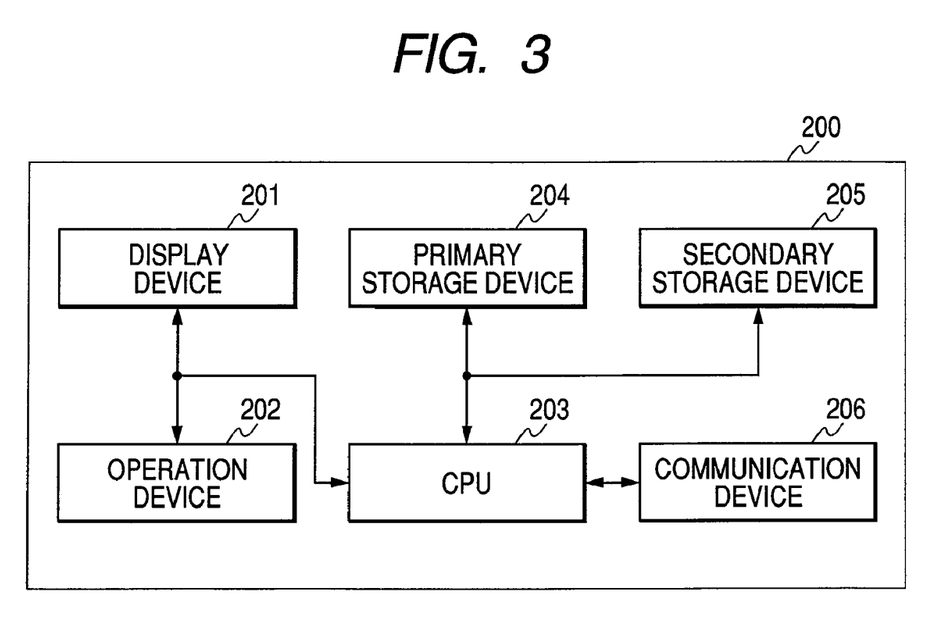
FIG. 3 is a block diagram schematically showing a configuration of an information processing apparatus embodying the present invention.

FIG. 3 is a schematic view showing a configuration of an information processing apparatus embodying the present invention.

Referring to FIG. 3, the information processing apparatus 200, for example, of a computer is provided with a CPU 203, and a display device 201, an operation device 202, a primary storage apparatus 204, a secondary storage apparatus 205 and a communication apparatus 206, each connected to the CPU 203.

The CPU 203 executes various calculations and controls components constituting the information processing apparatus 200. The display device 201 displays a character, an image and the like. The operation device 202 accepts an operation of the user. The primary storage apparatus 204 stores temporary data, and is used as a work area for the CPU 203. The secondary storage apparatus 205 stores an operating system for controlling the information processing apparatus 200 and programs of various applications.

Data referred to by a program in the image pickup apparatus 100 include previous selection record data, which is recorded data of a last selected item in the menu 301. However, in the selection of an item, there are a case of storing the item and a case of not storing the item as will be explained later, so that the previous selection record is retained even after the power supply is turned off.

In the following description, a specified name is used as a variable or a value stored in data, but in fact a number or a character corresponding thereto is utilized.

The image pickup apparatus shown in FIG. 1 and the information processing apparatus shown in FIG. 3 constitute together an image pickup system. In such image pickup system, in case of an image transfer from the image pickup apparatus 100 to the information processing apparatus 200, the image pickup apparatus 100 executes an image transfer process to be explained later with reference to FIGS. 4 to 6, and the information processing apparatus 200 executes an image transfer process to be explained later with reference to FIG. 7 in cooperation with the image transfer process by the image pickup apparatus 100.

Figure 4:
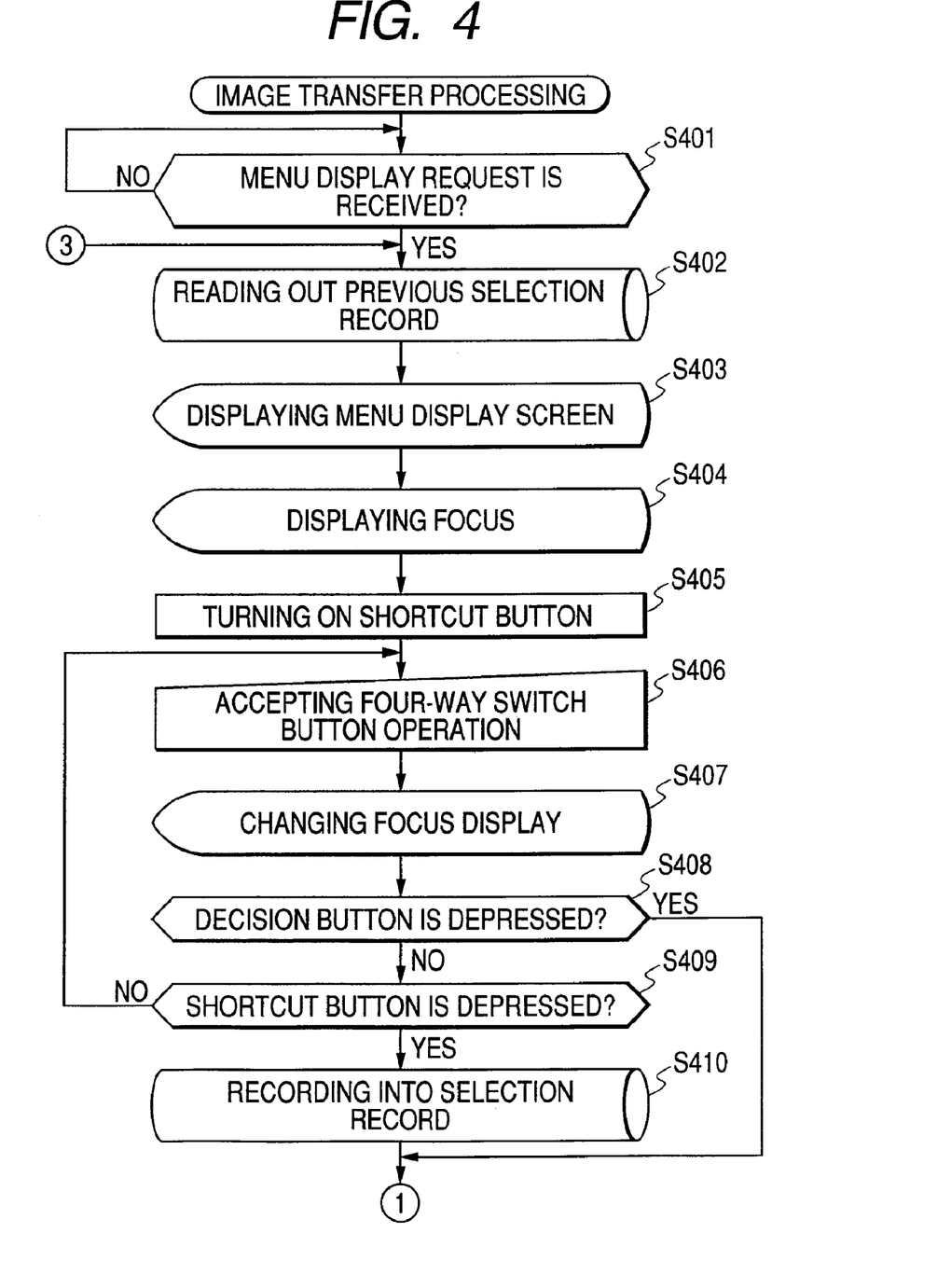
FIG. 4 is a flow chart of an image transfer process executed by an image pickup apparatus embodying the invention.
Figure 5:
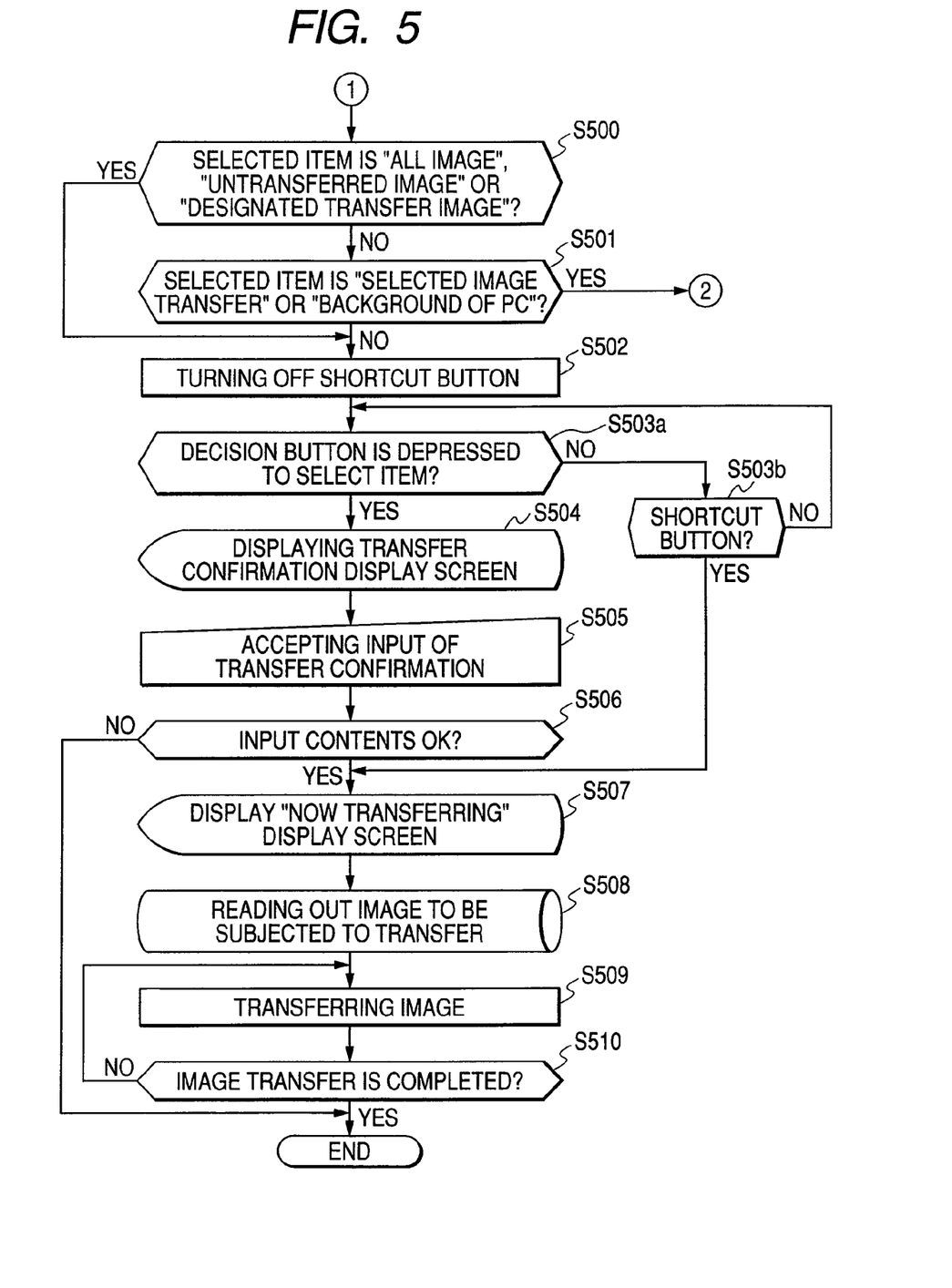
FIG. 5 is a flow chart of an image transfer process executed by an image pickup apparatus embodying the invention.
Figure 6:
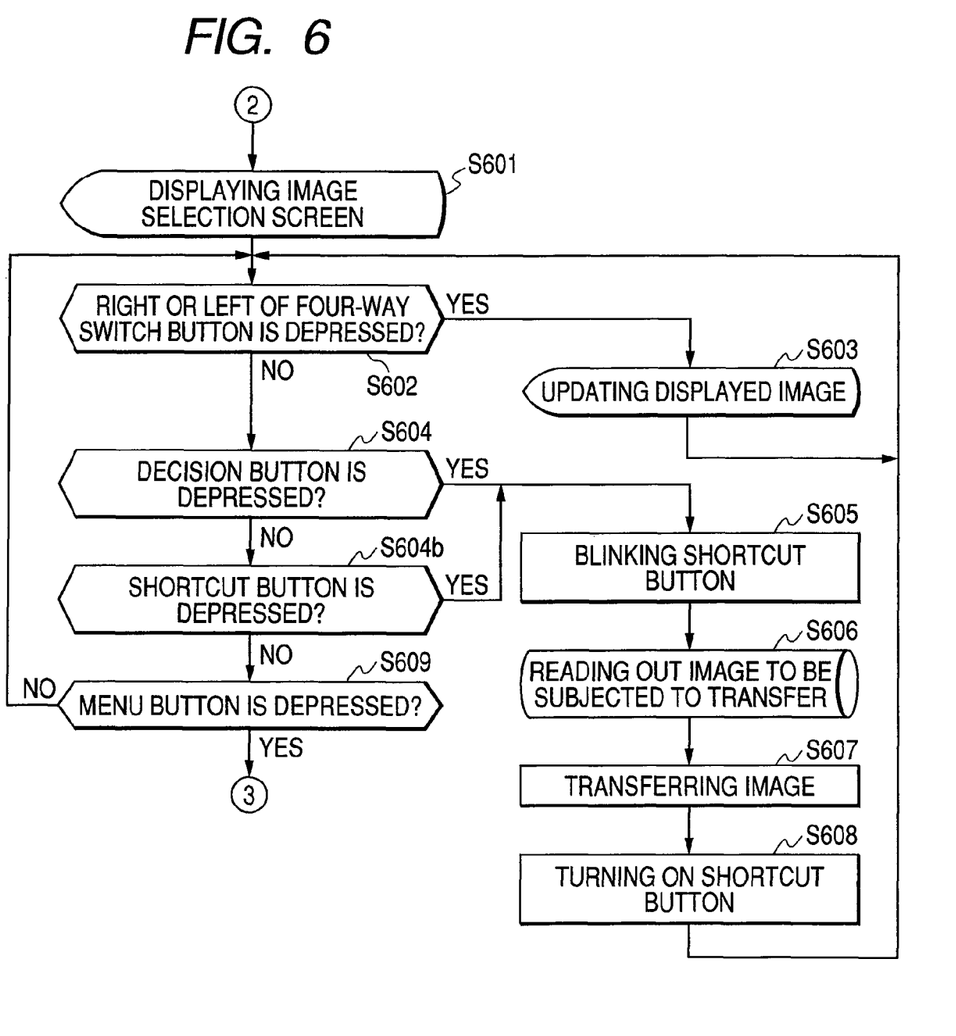
FIG. 6 is a flow chart of an image transfer process executed by an image pickup apparatus embodying the invention.

FIGS. 4 to 6 are flow charts of an image transfer process executed by the image pickup apparatus embodying the present invention.

The process shown in FIGS. 4 to 6 is executed in the image pickup apparatus 100, when it is connected to the information processing apparatus 200, by executing a program stored in the secondary storage apparatus 105 by the CPU 103.

Referring to FIG. 4, when a menu display request is accepted from the information processing apparatus 200 (YES in a step S401), a previous selection record stored in the secondary storage apparatus 105 is read out (step S402), then a menu display screen 301 is displayed on the display device 107 (step S403), and a focus is displayed on the menu display screen 301 according to the previous selection record (step S404). Then the shortcut button 111 is turned on, thereby indicating that the operation of the button is enabled (step S405) and an operation of the four-way switch button 108 by the operator is accepted (step S406). Then the focus display on the menu 301 is changed according to such operation, and the focus display is moved up or down according to the up/down input of the four-way switch button 108 (step S407).

Then there is discriminated whether the decision button 108 is depressed (step S408), and there is discriminated whether the shortcut button 111 is depressed (step S409). As a result of the discriminations in the steps S408 and S409, in case the decision button 110 is not depressed (NO in step S408) and the shortcut button 111 is depressed (YES in step S409), the focused item, namely the selected item, is recorded as the previous selection item (step S410) (control means), whereupon the sequence proceeds to a step S500 in FIG. 5.

In case the discrimination in the step S408 identifies that the determination button 110 is depressed, the sequence proceeds to the step S500 in FIG. 5 without executing the steps S409 to S410. Also in case the discrimination in the step S409 identifies that the shortcut button 111 is not depressed, the process of the steps S406 to S409 are repeated.

Subsequently, a step S500 in FIG. 5 discriminates whether the selected item is "all images," "untransferred image" or "designated transfer image," and, if not, whether the selected item is "selected image transfer" or "background of personal computer" (step S501).

In case the discriminations in steps S500 to S501 identifies that the selected item is "all images," "untransferred image" or "designated transfer image" (YES in step S500) or is other than "selected image transfer" or "background of personal computer" (NO in step S501), the shortcut button 111 is turned off (step S502).

Then there is discriminated whether the button depressed for item selection is the decision button 110 (step S503a), and, in case it is the decision button 110, a transfer confirmation display screen is displayed (step S504) (execution confirmation means, control means). Then an input of a transfer confirmation is accepted by the four-way switch button 108 and the decision button 110 (step S505), then there is discriminated whether an input content in the step S505 is OK (step S506), and, if not OK, the sequence is immediately terminated, but, if OK, the now-transferring display screen 303 is display device 107 (step S507) and image data to be transferred are read out from the storage medium 106 (step S508). The image data to be transferred are all the image data in case of "all images," image data not transferred yet in case of "untransferred image," or image data designated in advance for transmission and added to a transmission designating list in case of "designated transfer image."

Then the image data read in the step S508 are transmitted to the information processing apparatus 200 through the communication apparatus 109 (step S509), and the process is terminated upon completion of the transmission (YES in step S510).

In case the step S503a identifies that the decision button 110 is not depressed, there is discriminated whether the shortcut button 111 is depressed (step S503b), and, in case the shortcut button 111 is depressed, the sequence proceeds to a step S507 without executing the steps S504 to S506.

In case the discrimination of the step S501 identifies that the selected item is "selected image transfer" or "background of personal computer," the process proceeds to a step S601 in FIG. 6 for displaying an image selection screen 304. Also in case the right or left of the four-way switch button 108 is not depressed (NO in step S602), also the decision button 110 or the shortcut button 111 is not depressed (NO in steps S604 and S604b) and the menu button 112 is depressed (YES in step S609), the sequence proceeds to the step S402 in FIG. 4.

In case the discrimination of the step S602 identifies that the right or left of the four-way switch button 110 is depressed, a preceding or succeeding image of the previously displayed image is displayed as the image selection screen 304 according to the key depressed in the step S602 thereby renewing the display whereupon the sequence returns to the step S602.

In case the discrimination of the step S604 identifies that the decision button 110 is depressed, or in case the discrimination of the step S604b identifies that the shortcut button 111 is depressed, the shortcut button 111 is made to execute a blinking operation (step S605), then the image data to be transferred are read out (step S606) and transferred (step S607) and the shortcut button 111 is turned on (step S608) whereupon the sequence returns to the step S602.

In the processes shown in FIGS. 4 to 6, in case the decision button 110 is depressed (YES in steps S408 and 503b), the transfer confirmation screen 302 is displayed (step S504) without recording the selection record (step S410), and, in case the shortcut button 111 is depressed (YES in steps S409 and S503b), the selection record is recorded (step S410) while the transfer confirmation screen 302 is not displayed (step S504). Thus the user can select whether or not to record the selection position of the menu and whether or not to confirm execution of the transfer.

Figure 7:
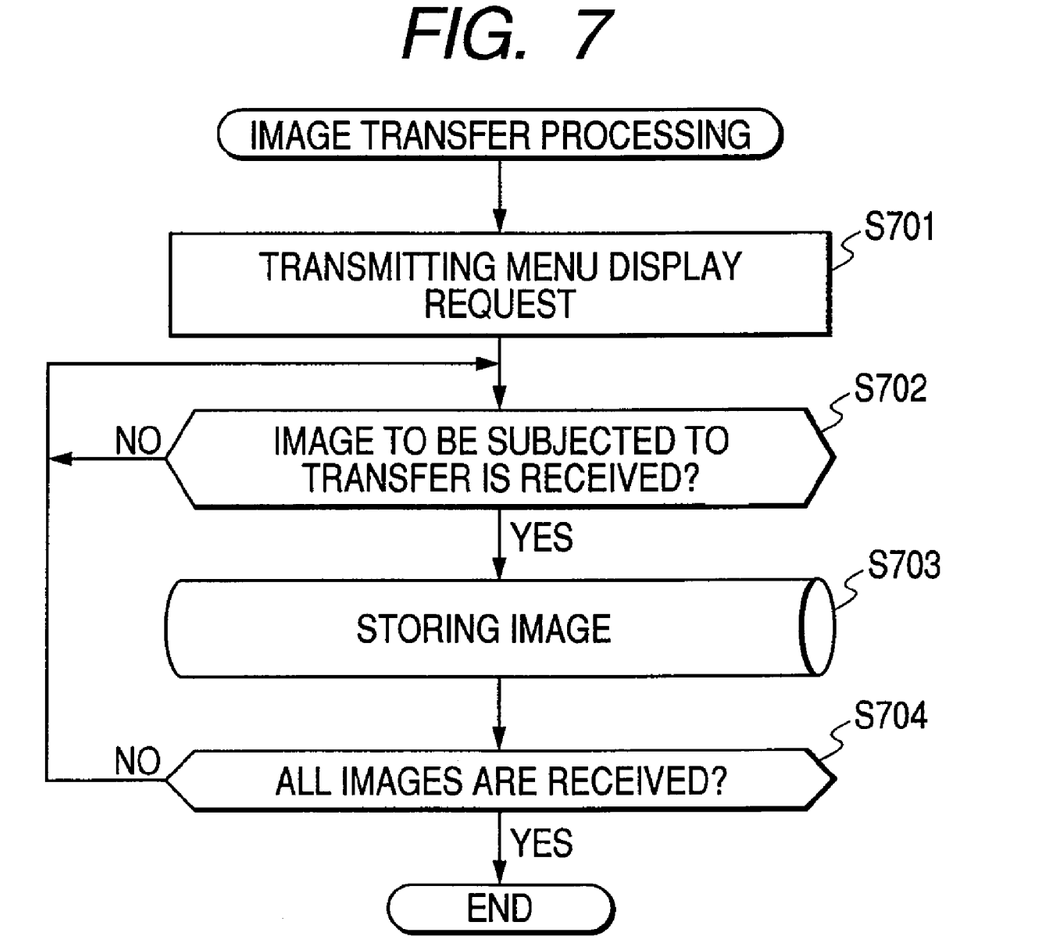
FIG. 7 is a flow chart of a process in an information processing apparatus embodying the invention.

FIG. 7 is a flow chart of an image transfer process executed by the information processing apparatus embodying the present invention.

The process shown in FIG. 7 is executed in the information processing apparatus 200, when it is connected to the image pickup apparatus 100, by executing a program stored in the secondary storage apparatus 205 by the CPU 203.

Referring to FIG. 7, at first a menu display request is transferred to the image pickup apparatus 100 through the communication apparatus 206 (step S701), and, when image data are received from the image pickup apparatus (YES in step S702), the received image data are stored in the secondary storage apparatus 205 (step S703). The steps S702 to S704 are repeated until all the image data are received (YES in step S704), whereupon the process is terminated.

In the process shown in FIG. 7, when image data are received from the image pickup apparatus (YES in step S702), the received image data are stored in the secondary storage apparatus 205 (step S703), so that the image data to be transferred from the image pickup apparatus 100 can be stored in the secondary storage apparatus 205 of the information processing apparatus 200.

In the present invention explained in the foregoing, in case the menu decision button is depressed, the decided menu is not stored in the menu storage means but a confirmation is executed by the execution confirmation means, and, in case the shortcut button is depressed, the decided menu is stored in the menu storage means but a confirmation is not executed by the execution confirmation means, so that the user can select whether or not to store the selected position of the menu and whether or not to execute confirmation of the execution.

Also in the present invention, the shortcut button is turned on when it is effective but is turned off or made to blink when it is not effective, so that the user can easily confirm whether the selected position of the menu is stored or not.

In the following there will be explained a module configuration for realizing a communication function and a reproducing function in the digital camera 100 in an embodiment of the invention.

Figure 8:
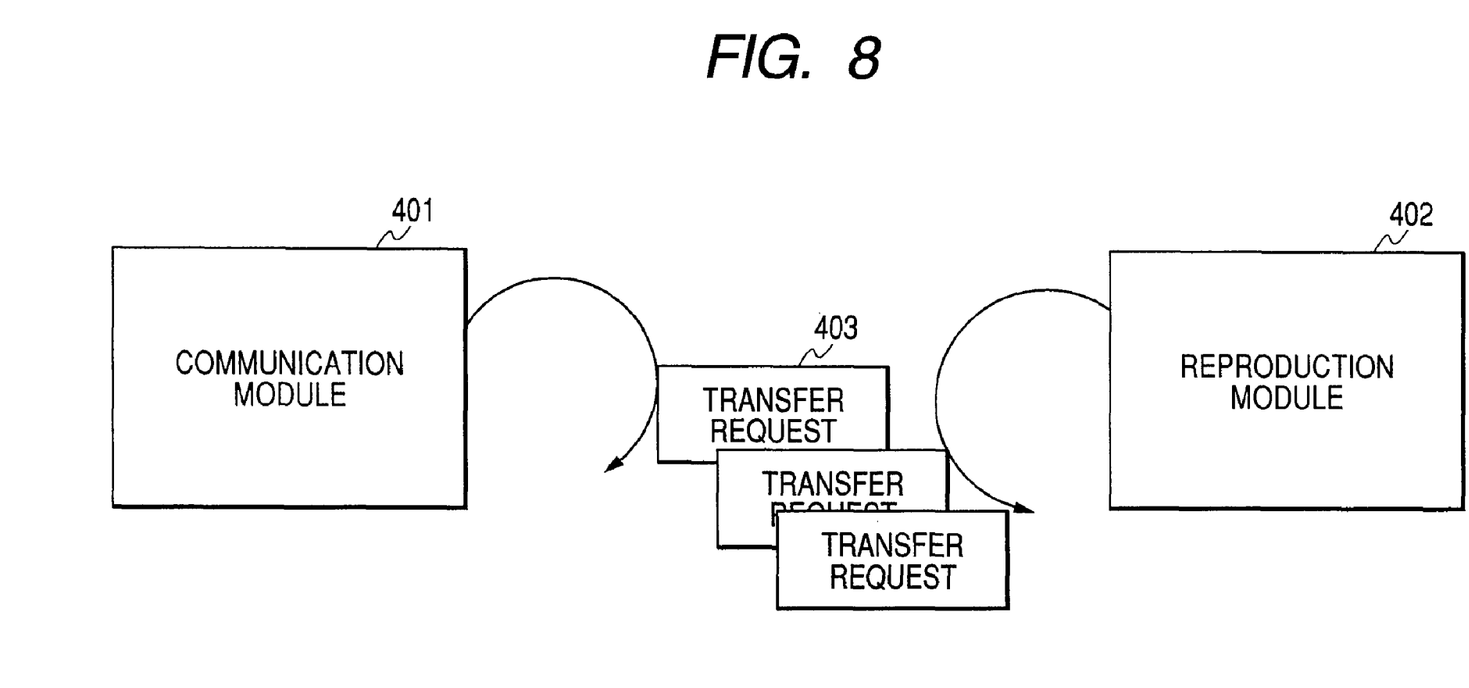
FIG. 8 is a view showing a module structure in a digital camera 100 in an embodiment of the invention.

FIG. 8 shows an example of a module configuration in the digital camera 100 in an embodiment of the present invention. As shown in FIG. 8, a communication function and a reproduction function of the digital camera 100 are realized by a communication module 401 which exchanges data with an external apparatus (information processing apparatus 200 in the present embodiment) through communication therewith, and a reproduction module 200 which displays an image, recorded in the digital camera 100, on a display device 107 such as a liquid crystal display provided on the digital camera 100. Data referred to by a program in the image pickup apparatus 100 include previous selection record data, which is recorded data of a last selected item in the menu 301. However, in the selection of an item by the user, there are a case of storing the item and a case of not storing the item as will be explained later, depending upon the type of the button depressed by the user as will be explained later. The previous selection record, being stored in the secondary storage apparatus 105, is retained even after the power supply is turned off. In the following description, a specified name is used as a variable or a value stored in data, but in fact a number or a character corresponding thereto is utilized.

Also the communication module 401 and the reproduction module 402 shown in FIG. 8 are both programs stored in the secondary storage apparatus 105 and executed by the CPU 103 under the utilization of the primary storage apparatus 104. These two modules are executed, for example, as separate processes, simultaneously by the CPU 103 with respective operations in asynchronous manner. For the purpose of data exchange between the reproduction module 402 and the communication module 401, a message queue (hereinafter simply called queue) 403 is provided. When an operation member such as a button is operated by the user, the reproduction module 402, in response to an operation signal (operation event) thereof, specifies image data to be transferred to an external apparatus (information processing apparatus 200 in the present embodiment), and a transfer requesting message is loaded on the queue 403 at the start of transmission of specified image data. The communication module 401 acquires the transfer request from the queue 403, and transfers the designated image data to the external apparatus (information processing apparatus in the present embodiment) through the communication apparatus 109.

In the following, there will be explained processes of the reproduction module 402 and the communication module 401 shown in FIG. 8.

Figure 9:
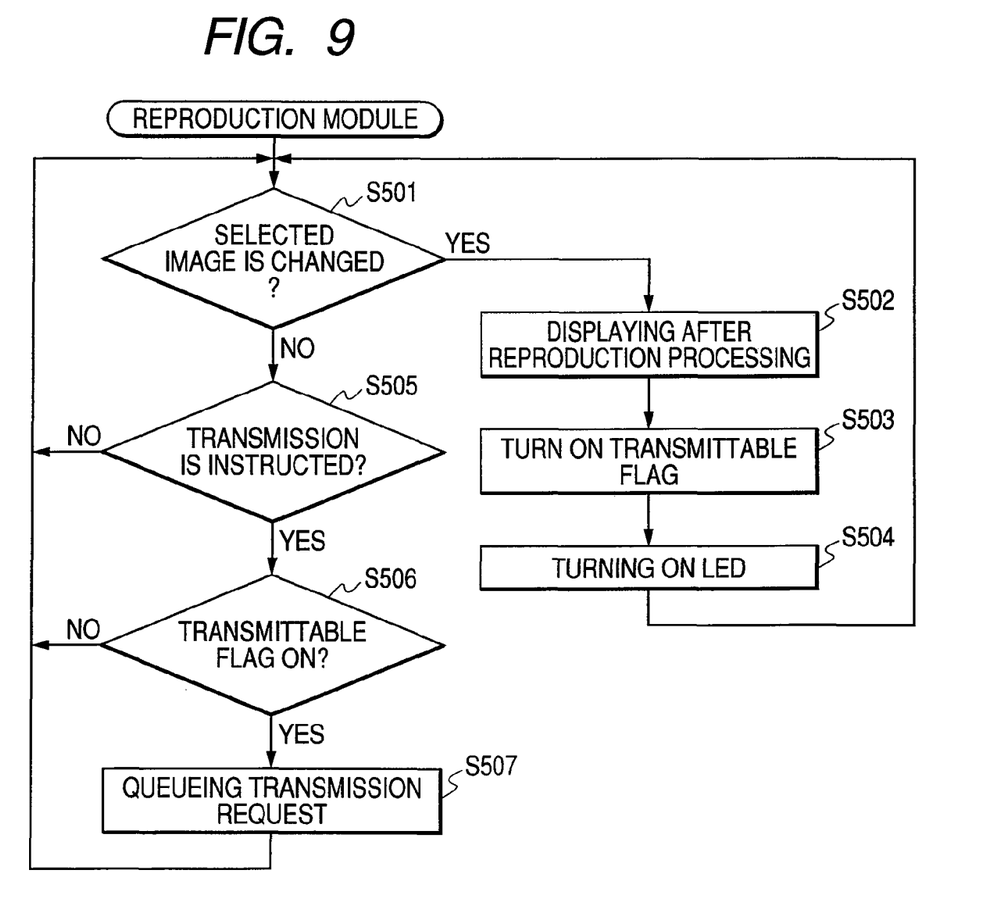
FIG. 9 is a flow chart showing a process in a reproducing module 402.

At first, a process of the reproduction module 402 will be explained. FIG. 9 is a flow chart showing a process of the reproduction module 402. At first, as shown in FIG. 9, the reproduction module 402 awaits in a stationary state an operation event from the operation member. In case of receiving an operation event of an instruction for changing a displayed image (YES in step S501), the reproduction module 402 executes a process for reproducing and displaying a new image (step S502). Then the reproduction module 402 turns on a transmittable flag (accepting state information) (step S503). Then the reproduction module 402 turns on a light-emitting member (LED) incorporated in the shortcut button 111 (step S504) and returns to the step S501, thus awaiting a next operation even. The turned-on state of the light-emitting member indicates a state where the user can start transmission of image data from the digital camera 100 to the information processing apparatus 200. Also a blinking state of the light-emitting member indicates that the digital camera 100 is in the course of transferring the image data to the information processing apparatus 200, so that the start of transfer of next image data cannot be instructed.

Also in case of not receiving an operation event of an instruction for changing a displayed image (NO in step S501), the sequence proceeds to a step S505 to discriminate whether an operation event is received as an instruction of transmitting an image in reproduction process (in the course of display on the display device 107) to the information processing apparatus 200. More specifically, when the user depresses the shortcut button 111 in the course of reproduction of a selected image, the reproduction module 402, judging to have received an operation event for a transmitting instruction (YES in step S505), discriminates whether the transmittable flag is turned on (step S506). In case the transmittable flag is judged to have been turned on (YES in step S506), the reproduction module 401 queues in the queue 403 a transmission request for informing to the communication module 401 (step S507), and the sequence returns to the step S501 to await a next operation event.

In case it is judged the reproduction module 402 does not receive an operation event for a transmission instruction (NO in step S505) or the transmittable flag is not turned on (NO in step S506), the sequence returns to the step S501 to await a next operation event.

Figure 10:
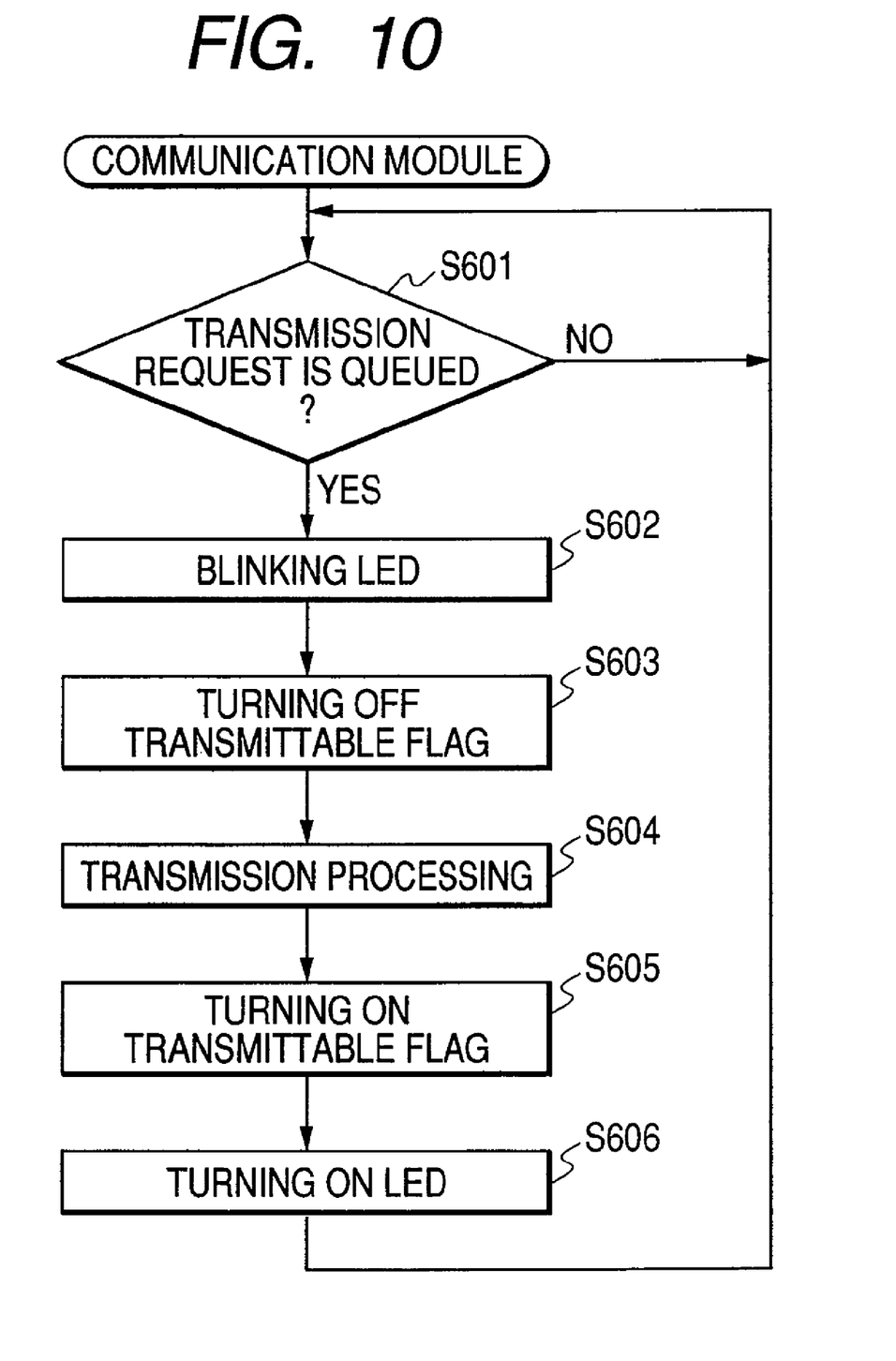
FIG. 10 is a flow chart showing a process in a communication module 401.

In the following, there will be explained a process of the communication module 401. FIG. 10 is a flow chart showing a process of the communication module 401.

At first, the communication module 401 monitors the queue 403 for a transmission request, queued by the reproduction module 402, thereby discriminating whether a new transmission request has been queued (step S601). In case a new transmission request is present in the queue 403 (YES in step S601), the communication module 401 causes the light-emitting member, incorporated in the shortcut button 111, to blink (step S602). Then the communication module 401 turns off the transmittable flat (step S603). In this manner the reproduction module 402 becomes unable to execute a next transmission even upon receiving a transmission instruction.

Then the communication module 401 transmits designated image data to the external apparatus (information processing apparatus 200 in the present embodiment) (step S604). The communication module 401 can utilize various communication methods. Though detailed description will be omitted as it is not related to the essence of the present invention, the communication method for the image data transfer can be that based on an ordinary protocol, such PTP (picture transfer protocol) or MSC (mass storage class) in a wired connection such as USB. Also there may be adopted a communication method of executing a logical connection by a wireless communication instead of a wired connection, such as a wireless LAN.

Then, upon completion of the image data transfer in the step S604, the communication module 401 returns the transmittable flat to "ON" state (step S605). Thus the reproduction module 402 is enabled for a next transmission instruction. Then the communication module 401 returns the light-emitting member incorporated in the shortcut button 111 from the blinking state to a turned-on state (step S606). Then the communication module returns to the step S601 and monitors the queue 403 for a next transmission request. Through the above-explained operation, the digital camera 100 can avoid, during the transfer of the image data to the information processing apparatus 200, a repeated transfer request for the same image data.

Also, as explained in the foregoing, the reproduction module 402 and the communication module 401 function in asynchronous manner, and, as indicated by the process of the steps S502 to S504, even in the course of transfer of image data from the communication module 401 to the external apparatus (information processing apparatus 200), the reproduction module 402 can reproduce and display other image data. Also in case a transmission instruction is given in the course of display of other image data, the transfer request for such other image data can be queued on the queue 403. Also whether a transmission request is possible for the image data currently reproduced and displayed can be indicated to the user by the lighting of the light-emitting member incorporated in the shortcut button 111.

In the above-described configuration, same image data cannot be transmitted plural times by giving plural transmission instructions, but it is possible, in the course of transfer of certain image data from the digital camera 100, to display other plural image data or to store a transfer request for the displayed other plural image data in the queue 403 in response to an instruction from the user. Thus there can be executed an operation that the communication module 401 executes transfer processes in succession on the transfer requests stored in the queue 403. Thus, the digital camera 100 of the present embodiment can provide an environment in which the user can select an image to be transferred or execute a transfer instruction to a selected image without stress and without causing the user to notice the transfer time of the image data to the information processing apparatus. Also the light-emitting member incorporated in the shortcut button 111 changes the display in synchronization with the reproduction or the transfer of the image data, thereby exactly indicating the operation state of the digital camera 100 to the user.

Therefore, even during a transfer process of image data to the external apparatus, the user can execute a selection for transferring other image data, whereby the user can comfortably executes a selecting operation for the image data to be transferred.

In the foregoing embodiment, the functions of the digital camera 100 are realized by storing the programs (modules) for realizing such functions in a memory and executing such program by the CPU, but such embodiment is not restrictive and all the processes or a part thereof may be realized by an exclusive hard disk. Also the aforementioned memory may be constituted of a non-volatile memory such as a magnetooptical disk apparatus, or a flush memory, a read-only storage medium such as a CD-ROM, a volatile memory other than a RAM, or a computer read-writable storage medium formed by a combination thereof.

Also the processes may be realized by recording a program, for realizing the functions of various processes in the digital camera 100, in a computer-readable storage medium and by reading and executing the program stored in the storage medium by a computer system. The "computer system" includes an OS and a hardware such as a peripheral equipment.

In such case, the program codes themselves read out from the storage medium realize the functions of the aforementioned embodiments, and the storage medium storing the program codes constitutes the present invention.

The present invention also includes not only a case where the computer executes the read-out program codes to realize the functions of the aforementioned embodiments but also an operating system (OS) or the like functioning on the computer executes all the actual processes or a part thereof thereby realizing the functions of the aforementioned embodiments.

The present invention naturally includes naturally a case where the program codes read out from the storage medium are stored in a memory provided in a function expansion card inserted into the computer or a function expansion board connected to the computer, and, based on the instructions of such program codes, a CPU or the like provided in such function expansion card or function expansion board executes all the processes or a part thereof thereby realizing the functions of the aforementioned embodiments.

The aforementioned program is only required to realize the functions of the aforementioned embodiments on a computer, and may assume a form of object codes, a program executed by an interpreter, or script data supplied to the OS.

A storage medium for supplying the program can be, for example, a RAM, an NV-RAM, a floppy (trade name) disk, an optical disk, a magnetooptical disk, a CD-ROM, an MO, a CD-R, a magnetic tape, a non-volatile memory card, or a ROM, that can store the aforementioned program. The program can also be downloaded from another unillustrated computer connected to an internet, a commercial network, or a local area network, or from a database.

Also the "storage medium" includes a storage which retains a program only for a limited time, for example a volatile memory (RAM) in a server or a client computer system, in case the program is transmitted from a network such as internet or through a communication channel such as a telephone line.

Also the program may be transmitted from a computer system which stores such program in a storage apparatus or the like, to another computer system by a transmission medium or a transmission wave in the transmission medium. The "transmission medium" for transmitting the program means a medium having a function of information transmission, for example a network (communication network) such as internet, or a communication channel (communication line) such as a telephone line.

Also the aforementioned program may be capable of realizing a part of the aforementioned functions. Also it may be so-called differential file (differential program) which realizes the aforementioned functions in combination with a program already recorded in the computer system.

Also a program product such as a computer readable storage medium storing the aforementioned program is also applicable as an embodiment of the invention. The program, the storage medium, the transmission medium and the program product mentioned above are also included in the present invention.

The present invention has been explained in detail by embodiments with reference to the accompanying drawings, but the specific configurations are not limited to such embodiments, and also include designs or the like within a range not departing from the principle of the present invention.

This application claims priorities from Japanese Patent Application Nos. 2004-030838 filed on Feb. 6, 2004 and 2004-031110 filed on Feb. 6, 2004, which are hereby incorporated by reference herein.

What is claimed is:

1. An image pickup apparatus comprising:
a display unit configured to display a menu screen including a plurality of items of a menu;
a first selection unit configured to select at least one of the plurality of items of the menu during the menu screen being displayed by the display unit;
a second selection unit configured to select at least one of the plurality of items of the menu during the menu screen being displayed by the display unit, the second selection unit being different from the first selection unit; and
an execution unit configured to execute processing corresponding to the selected item,
wherein if the second selection unit selects a predetermined item of the menu, the display unit displays a confirmation screen for confirming that the execution unit is to execute the processing, while if the first selection unit selects the predetermined item of the menu, the display unit does not display the confirmation screen so that the execution unit executes the processing corresponding to the selected item without the confirmation.

2. An image pickup apparatus according to claim 1, further comprising a transfer unit configured to transfer the image data from the image pickup apparatus to an external apparatus.

3. An image pickup apparatus according to claim 2, wherein the plurality of items displayed on the menu screen include an item for transmitting all of images stored on a recording medium to the external apparatus.

4. An image pickup apparatus according to claim 3, wherein the plurality of items displayed on the menu screen include an item for transmitting selected one of the images stored on the recording medium to the external apparatus,
wherein if the first selection unit selects, from among the plurality of items displayed on the menu screen, the item for transmitting all the images stored on the recording medium to the external apparatus, the display unit does not display the confirmation screen so that the execution unit executes the processing corresponding to the selected item without the confirmation, and
wherein if the first selection unit selects, from among the plurality of items displayed on the menu screen, an item for transmitting an image which has not yet been transferred to the external apparatus among the images stored on the recording medium, to the external apparatus, the display unit displays a selection screen for selecting the image to be transmitted.

5. An image pickup apparatus according to claim 2, wherein the plurality of items displayed on the menu screen include an item for transmitting an image which has not yet been transferred to the external apparatus among the images stored on the recording medium, to the external apparatus.

6. An image pickup apparatus according to claim 2, wherein the plurality of items displayed on the menu screen include an item for transmitting images listed in advance as a subject of transmission among the images stored on the recording medium.

7. An image pickup apparatus according to claim 1, wherein the image pickup apparatus is activated by an instruction from the external apparatus to display the menu.

8. An image pickup apparatus according to claim 1, wherein the first selection unit is lighted when it is active and is extinguished or made to blink when it is inactive.

9. An information processing apparatus connected to an image pickup apparatus according to claim 1, comprising an image acquisition unit configured to acquire image data transferred from the image pickup apparatus.

10. A control method of an image pickup apparatus comprising:
- a display step of displaying a menu screen including a plurality of items of a menu;
- a first selection step of selecting at least one of the plurality of items of the menu during the menu screen being displayed by the display unit;
- a second selection step of selecting at least one of the plurality of items of the menu during the menu screen being displayed by the display unit, the second selection step being different from the first selection step; and
- an execution step of executing processing corresponding to the selected item,
- wherein if the second selection step selects a predetermined item of the menu, the display step displays a confirmation screen for confirming that the execution unit is to execute the processing, while if the first selection step selects the predetermined item of the menu, the display step does not display the confirmation screen so that the execution step executes the processing corresponding to the selected item without the confirmation.

11. A computer readable storage medium storing a program comprising a code for causing a computer to execute a control method of an image pickup apparatus, the control method comprising:
- a display step of displaying a menu screen including a plurality of items of a menu;
- a first selection step of selecting at least one of the plurality of items of the menu during the menu screen being displayed by the display unit;
- a second selection step of selecting at least one of the plurality of items of the menu during the menu screen being displayed by the display unit, the second selection step being different from the first selection step; and
- an execution step of executing processing corresponding to the selected item,
- wherein if the second selection step selects a predetermined item of the menu, the display step displays a confirmation screen for confirming that the execution unit is to execute the processing, while if the first selection step selects the predetermined item of the menu, the display step does not display the confirmation screen so that the execution step executes the processing corresponding to the selected item without the confirmation.

\* \* \* \* \*